United States Patent Office 2,957,898
Patented Oct. 25, 1960

2,957,898

PRODUCTION OF TRIETHYLALUMINUM

John F. Nobis and Louis F. Moormeier, Cincinnati, Ohio, assignors to National Distillers and Chemical Corporation, New York, N.Y., a corporation of Virginia No Drawing. Filed Apr. 1, 1958, Ser. No. 725,479

6 Claims. (Cl. 260—448)

The present invention relates to a method for preparation of substantially pure triethylaluminum in high yields.

It is known in the art that triethylaluminum can be prepared by reaction of an alkali metal such as sodium with ethylaluminum sesquichlorides, i.e., mixtures of ethylaluminum dichloride and diethylaluminum chloride, and the resulting triethylaluminum can be recovered by distillation. However, in such a method there is formed, mainly during the distillation for recovery of the triethylaluminum, a substantial amount of diethylaluminum hydride and, in many instances, the latter material is in amounts of from about ten to fifty percent (by weight) of the crude triethylaluminum distillate. Accordingly, for such purposes, it is necessary to subject the crude product to substantial additional processing to obtain the triethylaluminum in substantially pure form and, in so doing, yields are sacrificed.

The present invention is based on the discovery that substantially pure triethylaluminum, i.e., substantially free of diethylaluminum hydride, can be obtained in nearly theoretical yields if the triethylaluminum, prepared from an alkali metal and ethylaluminum sesquichloride, is distilled in the presence of ethylene. Thus the process embodied herein involves reaction of an alkali metal and ethylaluminum sesquichloride to produce a reaction product containing triethylaluminum and the triethylaluminum obtained in a pure form by distillation in the presence of ethylene. Also embodied herein is a process in which the alkali metal and ethylaluminum sesquichloride are reacted in the presence of ethylene with simultaneous distillation or distillation when the reaction is complete.

In accordance with this invention and, as aforesaid, the distillation is carried out in the presence of ethylene. Preferably, and especially in instances wherein the distillation is carried out with mixtures of triethylaluminum and diethylaluminum hydride, the ethylene is used in an amount of at least one mole of ethylene to one mole of diethylaluminum hydride and, more preferably, the distillation is carried out in the presence of a substantial excess of ethylene as, for example, up to a 100% excess although satisfactory results can be obtained using a 20–30% excess of ethylene.

The process embodied herein may be used in the preparation of triethylaluminum by reacting the alkali metal with ethylaluminum sesquichloride utilizing the alkali metal in any of various forms, e.g., molten metal, alkali metal ribbon, alkali metal dispersed in an inert liquid (such as mineral oils, waxes, etc.), or dispersed as a coating on a finely divided inert solid substance such as sodium chloride, aluminum, sand, carbon, etc. Although the alkali metal may be used in stoichiometric amounts for conversion of the sesquichlorides to triethylaluminum, use of an excess is preferred such as, for example, up to about a 15% excess.

The temperature employed for carrying out the reaction between the alkali metal and sesquichlorides is above the melting point of the alkali metal but below about 200° C. and, preferably from about 130 to 195° C. In a batch or semi-batch operation in which the triethylaluminum is initially formed and recovered in a separate distillation step, the initial reaction is carried out at above the melting point of the alkali metal, e.g., sodium, preferably above about 130° C. but at a temperature below about 200° C., followed by subjecting the reaction mixture to a temperature above about 190° C. but below about 200° C. to distill the triethylaluminum. The process can, however, be carried out at above 190° C. but below about 200° C. in a reactor equipped with a distillation column whereby the triethylaluminum is distilled over as it forms.

In order to more fully describe the invention, several embodiments are set forth hereinafter.

*Example 1*

A three-liter, three-necked, round bottomed, flask equipped with an anchor-type stirrer, a thermometer, a graduated dropping funnel, a metal condenser, and a receiver was charged with 200 grams of salt and 16.4 gram atoms of sodium. The internal temperature of the vessel was raised to above 100° C. to melt the sodium and 1.82 moles of ethylaluminum sesquichlorides (1:1 ratio of diethylaluminum chloride:monoethylaluminum dichloride) was slowly added over a two hour period while maintaining the vessel contents at 160–180° C. by use of a cooling bath. The condenser was maintained sufficiently cool to prevent distillation of the triethylaluminum product (B.P. 190–195° C.) before addition of the sesquichloride was completed. When such addition was completed, the condenser was replaced with a small Vigreaux column and there was recovered by distillation a crude triethylaluminum containing 20% diethylaluminum hydride.

To illustrate the improvement obtained by practice of this invention, two pounds of the triethylaluminum containing 20% diethylaluminum hydride were distilled under an atmosphere of ethylene in an amount in about 100% excess of one mole per mole of diethylaluminum hydride, at a pot temperature range of 185–219° C. and a head temperature of 177–183° C. The resulting distillate was water white and, upon analysis, comprised substantially pure triethylaluminum in a yield of 90–95%, i.e., the distillation in presence of the ethylene converted about 90–95% of the diethylaluminum hydride to triethylaluminum. Analysis of the product gave the following results.

| | Found | Calculated |
|---|---|---|
| Percent Al | 24.23 / 23.7 | 23.7 |
| Ethane | 18.01 m. moles | 18.54 m. moles. |
| H$_2$ | (none detected) | 0.0. |

In another run, the crude reaction product containing the dialkylaluminum hydride from the aforediscussed embodiment was distilled in presence of excess ethylene and triethylaluminum of 98% purity was obtained in 96% yield.

In still another run, the aforediscussed process was carried out as a continuous reaction at 200° C. in the presence of ethylene and the triethylaluminum that was distilled as it formed was obtained as a distillate of 90–95% purity in 80% yield.

*Example 2*

Using an apparatus assembly as in Example 1, a total of 6 gram atoms of sodium were charged to the nitrogen purged flask and melted. Ethylaluminum sesquichlorides (1.83 moles) were gradually added to the sodium during two and one-quarter hours while maintaining the pot temperature below the boiling point of the triethylaluminum with a cooling bath. The apparatus was rearranged for distillation and the crude product was collected in 90% yield. Gas analysis of this product showed the presence of hydrogen and ethane which calculated as 15% diethylaluminum hydride contaminant in the triethylaluminum. It was also noted that when the product was redistilled, the hydride contamination increased to as much as 50% due to further decomposition of the triethylaluminum.

*Example 3*

In a run comparable to that of Example 2, sodium (5.65 gram atoms) was charged into the flask under nitrogen and the temperature brought up to the melting point of sodium. To this melt, 1.83 moles of ethylaluminum sesquichlorides (1.83 moles) was slowly added over a two and one-half hour period while maintaining the reaction temperature below the boiling point of the product by means of a cooling bath. Upon completion of the sesquichloride addition, a small Vigreaux column replaced the metal condenser. An amount of ethylene in excess (20–30%) of one mol per mol of expected diethylaluminum hydride (15–20%) was continuously charged into the reactor during the distillation of the triethylaluminum. A relatively pure (98%) water-white triethylaluminum product was obtained from the reactor in a yield of 90–95%.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for preparation of triethylaluminum by reacting an alkali metal with ethylaluminum sesquichlorides and recovery of the triethylaluminum by distillation during which a substantial amount of diethylaluminum hydride is formed by decomposition of substantial quantities of the triethylaluminum, the improvement which comprises distilling the triethylaluminum in the presence of ethylene whereby the triethylaluminum is obtained as a distillate of reduced contamination with diethylaluminum hydride.

2. A process, as defined in claim 1, wherein the distillation is carried out in presence of ethylene in an amount in excess of one mole per mole of diethylaluminum hydride normally formed in said process in absence of distillation in presence of ethylene.

3. In a process for preparation of triethylaluminum by reacting an alkali metal with ethylaluminum sesquichlorides at an elevated temperature to provide a reaction mixture containing triethylaluminum and subsequently distilling the triethylaluminum from said mixture with unavoidable formation of diethylaluminum hydride, the improvement which comprises distilling said triethylaluminum from said reaction mixture in the presence of ethylene.

4. A process, as defined in claim 3, wherein the distillation is carried out in presence of ethylene in an amount in excess of one mole per mole of diethylaluminum hydride formed in said process in absence of distillation in presence of ethylene.

5. In a process for preparation of triethylaluminum by reacting an alkali metal with ethylaluminum sesquichlorides at an elevated temperature sufficient to distill off the triethylaluminum as it is formed and during which diethylaluminum hydride is unavoidably formed by decomposition of substantial quantities of the triethylaluminum, the improvement which comprises carrying out the reaction in the presence of ethylene whereby the triethylaluminum is distilled in presence of ethylene and a distillate triethylaluminum of substantially reduced content of diethylaluminum hydride is obtained.

6. A process, as defined in claim 5, wherein the ethylene is present in an amount in excess of one mole per mole of diethylaluminum hydride normally formed in said process in absence of ethylene.

References Cited in the file of this patent

UNITED STATES PATENTS

| 2,826,598 | Ziegler et al. | Mar. 11, 1958 |
| 2,838,556 | Cottle | June 10, 1958 |
| 2,843,474 | Ziegler et al. | July 15, 1958 |

OTHER REFERENCES

Article by Ziegler and Gilbert in "Angewandte Chemie," vol. 67 (1955), pages 424–425.

Chemical Abstracts, vol. 50 (1956), col. 164i.